(12) United States Patent
Mendenhall et al.

(10) Patent No.: US 9,729,817 B2
(45) Date of Patent: Aug. 8, 2017

(54) PARALLEL PIPELINES FOR MULTIPLE-QUALITY LEVEL VIDEO PROCESSING

(71) Applicant: BROADCOM CORPORATION, Irvine, CA (US)

(72) Inventors: Todd Christopher Mendenhall, San Jose, CA (US); Jason William Herrick, Pleasanton, CA (US); Yao-Hua Tseng, Fremont, CA (US)

(73) Assignee: AVAGO TECHNOLOGIES GENERAL IP (SINGAPORE) PTE. LTD., Singapore (SG)

(*) Notice: Subject to any disclaimer, the term of this patent is extended or adjusted under 35 U.S.C. 154(b) by 141 days.

(21) Appl. No.: 14/097,170

(22) Filed: Dec. 4, 2013

(65) Prior Publication Data

US 2015/0124165 A1 May 7, 2015

Related U.S. Application Data

(60) Provisional application No. 61/900,264, filed on Nov. 5, 2013.

(51) Int. Cl.
*H04N 7/01* (2006.01)
*H04N 21/4402* (2011.01)

(52) U.S. Cl.
CPC ..... *H04N 7/0117* (2013.01); *H04N 21/44029* (2013.01); *H04N 21/440218* (2013.01)

(58) Field of Classification Search
CPC .............. H04N 7/012; H04N 7/0112; H04N 21/440218; H04N 21/44029

USPC .................................................. 348/453, 448
See application file for complete search history.

(56) References Cited

U.S. PATENT DOCUMENTS

| 5,329,309 | A | * | 7/1994 | Dorricott et al. ............... 348/97 |
| 6,563,534 | B1 | * | 5/2003 | Shimizu ..................... 348/222.1 |
| 7,630,018 | B2 | * | 12/2009 | Kawa et al. .................. 348/569 |
| 8,072,449 | B2 | * | 12/2011 | Ford ...................... G09G 5/363 |
| | | | | 345/419 |
| 2004/0150747 | A1 | * | 8/2004 | Sita .............................. 348/558 |
| 2005/0001929 | A1 | * | 1/2005 | Ochial .................. H04N 7/012 |
| | | | | 348/448 |
| 2011/0242370 | A1 | * | 10/2011 | Endo ............................ 348/241 |
| 2015/0229878 | A1 | * | 8/2015 | Hwang ............... H04N 7/0125 |
| | | | | 348/446 |

* cited by examiner

*Primary Examiner* — Michael Lee
(74) *Attorney, Agent, or Firm* — McDermott Will & Emery LLP

(57) ABSTRACT

A device for multiple-quality level video processing includes a primary tap configured to receive prime-quality video content from a source and to provide the prime-quality video content to a primary path and to a secondary tap. The primary tap may be operable in a prime-quality mode. The secondary tap may be disposed after the primary tap and may be coupled to a number of secondary paths. One or more dithering modules may be disposed after the primary tap. The dithering module(s) may be configured to convert the prime-quality video content provided by the primary tap to lower-bit precision and/or lower pixel-rate video content for use in one or more of the secondary paths.

20 Claims, 5 Drawing Sheets

PARALLEL PIPELINES FOR MULTIPLE-QUALITY LEVEL VIDEO PROCESSING

CROSS-REFERENCE TO RELATED APPLICATIONS

This application claims the benefit of priority under 35 U.S.C. §119 from U.S. Provisional Patent Application 61/900,264 filed Nov. 5, 2013, which is incorporated herein by reference in its entirety.

TECHNICAL FIELD

The present description relates generally to data communication, and more particularly, but not exclusively, to parallel pipelines for multiple-quality level video processing.

BACKGROUND

Digital video content may be encoded at various bit precision, resolution, and/or pixel rate depending on the requirement of an output device (e.g., a transcoder, a display device, etc.). Encoding at a higher bit precision, resolution, and /or pixel rate may require more resources and can be costlier. For example, ultra-high definition (UHD) content may be encoded at 10-bit precision with a pixel rate of 594 mega-pixels per second (Mpps). Accordingly, the processing of the UHD content by a set-top box (STB) may require significant resources and/or may consume substantial amounts of power. However, one or more outputs of the STB, e.g. transcoder outputs, standard (e.g., non-HDMI) outputs, etc., may not require the full resolution of the bit precision of the UHD 10-bit video at the pixel rate of 594 Mpps.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

In one or more aspects, methods and implementations for multiple-quality level video processing are provided. A primary path may be provided for processing video content at the source quality defined, for example, by a source resolution, bit precision, and/or pixel rate (e.g., ultra-high definition (UHD) 10-bit video at 594 mega-pixels per second (Mpps)), and one or more secondary paths may be provided for processing the content at a different quality level (e.g., a lower resolution, bit precision, and/or pixel rate, such as HD video (1080p60) 8-bit video at ¼ of the UHD pixel rate (e.g., 594/4=148.5 Mpps). The source content may be passed to a centralized scaler-dither module that dithers the source content, for example, to 8-bit video and/or reduces the pixel rate to a desired level. The video data from one or more secondary paths may be used for processing (e.g., for transcoding) and/or for output via, for example, and HD output ports. In this manner, the secondary paths can run at a lower resolution, bit precision, and/or frequency than the primary path, which may result in cost and/or area savings, as well as power savings.

Figure 1:
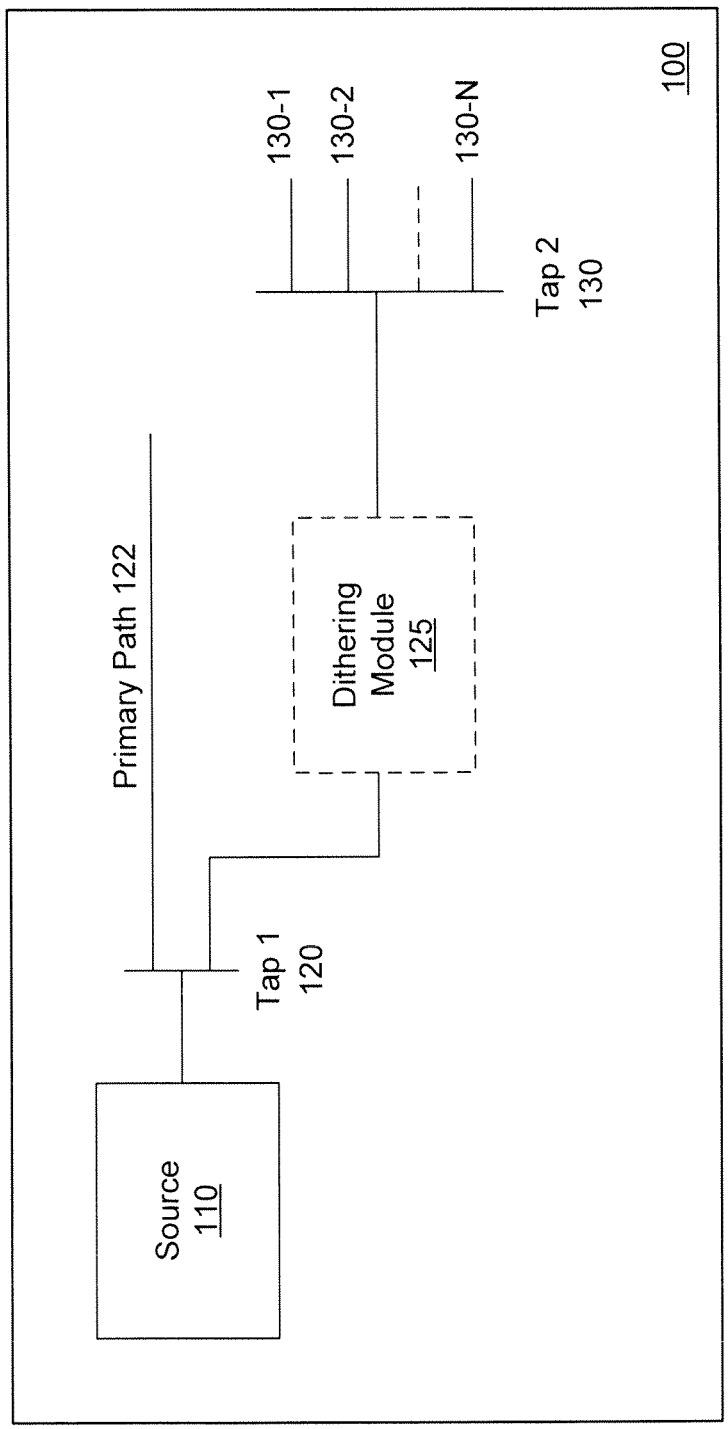
FIG. 1 illustrates a high-level block diagram of an example of a device for multiple-quality level video processing in accordance with one or more implementations.

FIG. 1 illustrates a high level block diagram of an example of a device 100 for multiple-quality level video processing in accordance with one or more implementations of the subject technology. The device 100 includes a primary tap 120 (e.g., Tap 1), a secondary tap 130 (e.g., Tap 2), and one or more dithering module(s) 125. The primary tap 120 may be configured to receive prime-quality video content from a source 110 (e.g., a storage device or a live source), and to provide the prime-quality video content to a primary path (e.g., pipeline) 122. The primary path 122 may be operable in a prime-quality mode and may be coupled (directly or indirectly) to the secondary tap 130 disposed after the primary tap 120. The secondary tap 130 may be configured to feed multiple secondary paths (e.g., pipelines such as 130-1, 130-2 . . . 130-N). Each of the secondary paths can be operable in a respective secondary-quality mode that can be achieved with less processing resources (e.g., less chip area, less power consumption, and/or less cost) than the prime-quality mode. The dithering module(s) 125 may be disposed after the primary tap 120 and configured to convert the prime-quality video content to lower-bit precision video content (e.g., HD 8-bit video) for use in one or more of the plurality of secondary paths. In some aspects, the dithering module(s) 125 may further convert the prime-quality video content to a lower pixel-rate or lower-resolution content that can be processed at a lower frequency. The pixel-rate conversion may be achieved by pixel-dropping or by line-dropping, which may result in a lower quality output than by pixel-dropping.

In one or more implementations of the subject technology, the prime-quality video content may include an ultra-high bit precision, an ultra-high resolution, and/or an ultra-high pixel rate video content. The prime-quality mode may include an ultra-high bit precision, an ultra-high resolution, and/or an ultra-high pixel rate mode. The ultra-high bit precision may include a bit precision equal to or higher than 10-bit precision. The bit precision value (e.g., 10-bit) may correspond to a single channel, which can represent a chroma (e.g., $C_b$ or $C_r$) or a luma (Y) associate with a pixel. In some aspects, a 4:2:2 video pixel format may be used, in which, for example, two adjacent pixels may have different luma values (e.g., Y1 and Y2), but share chroma values. The ultra-high resolution may include a resolution equal to or higher than 4k×2k pixels resolution (e.g., 3840 pixels×2160 lines). The ultra-high pixel rate may include a pixel rate equal to or higher than 297 Mpps.

In one or more implementations, the dithering modules 125 may include a single dithering module that, as shown in FIG. 1, is disposed prior to the secondary tap 130. In some aspects, one or more dithering modules may be disposed within some of the secondary paths (and not prior to the secondary tap 130) based on the desired quality of the video content in that path.

Figure 2A:
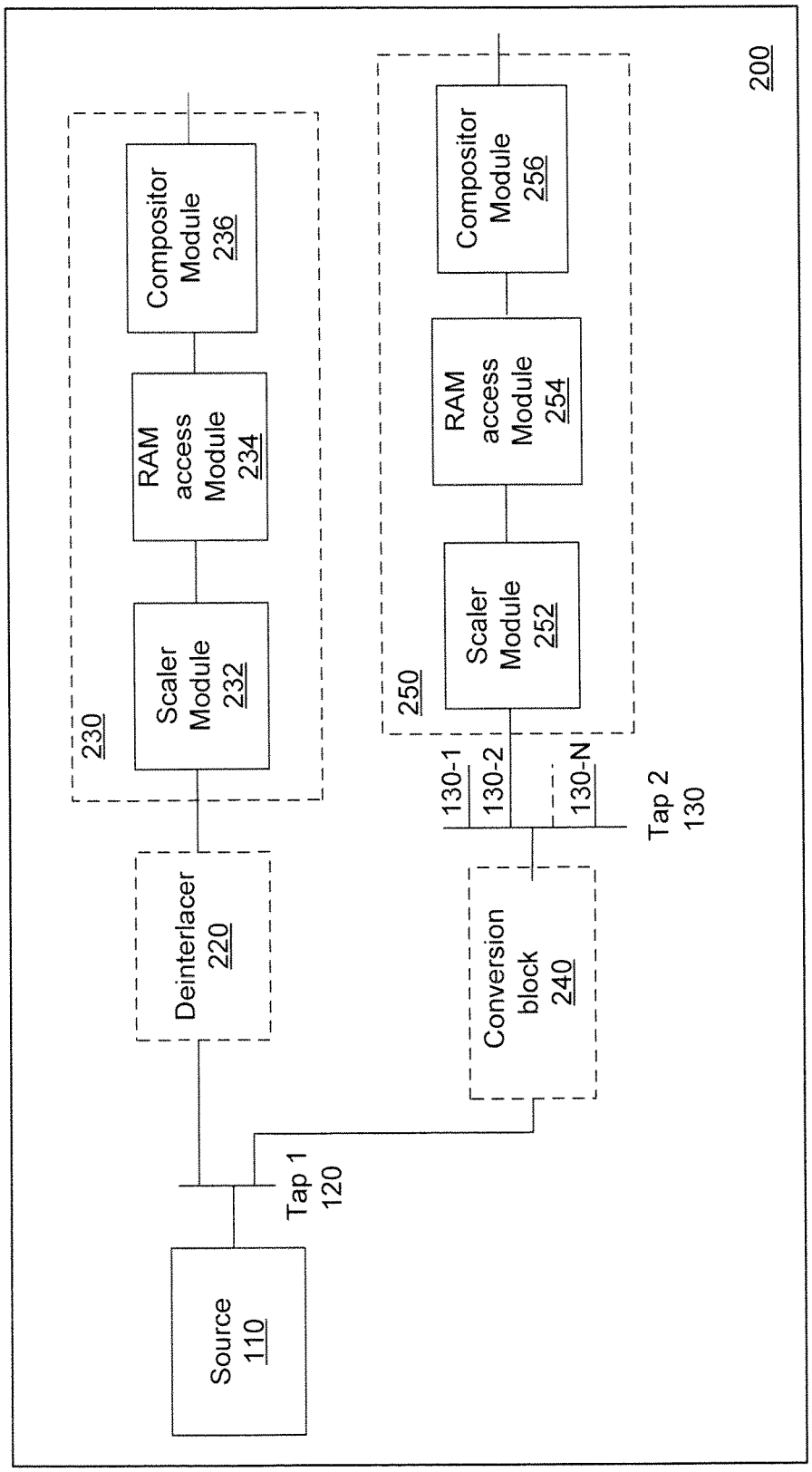
FIGS. 2A-2B illustrate block diagrams of an example of a device for multiple-quality level video processing and a conversion block of the device in accordance with one or more implementations.
Figure 2B:
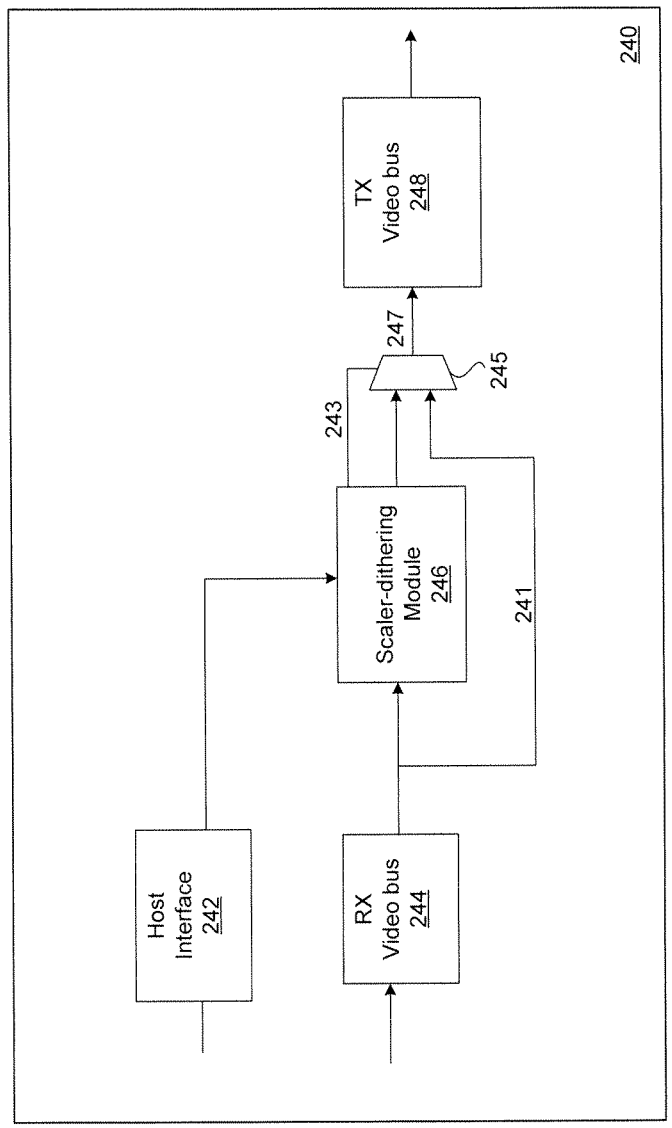

FIGS. 2A-2B illustrate block diagrams of an example of a device 200 for multiple-quality level video processing and a conversion block 240 of the device 200 in accordance with one or more implementations of the subject technology. The device 200 includes the primary tap 120, which feeds a primary path that includes an optional deinterlacer and a primary processing block 230, and is coupled to a secondary tap 130 directly or through a conversion block 240. In some aspects, the entire or a portion of the conversion block 240 may be incorporated into a number of secondary paths (e.g., 130-1, 130-2 . . . 130-N) fed by the secondary tap 130. Each of the secondary paths may include a secondary processing block 250.

The deinterlacer 220 is drawn with dash-lines to indicate that it can be employed when the video content provided by the source 110 is interlaced content, and otherwise, may be bypassed. In one or more implementations, the video content provided by the source 110 includes a prime-quality content, and the source 110 may include a digital noise reduction module (not shown in FIG. 2A, for simplicity). The primary processing block 230 may include, but is not limited to, a scaler module 232, a RAM access module 234, and a compositor module 236. In some aspects, the scaler module 232 may be configured to perform pixel-rate conversion or resolution conversion (e.g., converting to higher pixel rates or higher resolutions) to upscale lower quality video to UHD video to provide Ultra-HD content. The RAM access module 234 may be configured to perform RAM write (e.g., video capture) and/or RAM read (e.g., video feed). The compositor module 236 may be configured to composite graphics on the video content, for example, to generate picture-on-picture (PIP). The output of the compositor may be Ultra-HDMI content that can be delivered to an Ultra-HDMI display.

In one or more implementations, the secondary processing block 250 may include, but is not limited to, a scaler module 252, a RAM access module 234, and a compositor module 236, which may be structurally similar to the corresponding modules of the primary processing block 230. The functionalities of some or all of the modules of the secondary processing block 250, for different secondary paths, may be different. For example, the scaler module 252 in one or more of the secondary paths (e.g., 130-1) may convert the resolution (e.g., 4k×2k or higher) of the prime-quality video content to a lower pixel rate (e.g., 2k×2k or lower), and the scaler module 252 in one or more of the secondary paths (e.g., 130-2) may convert the pixel rate (e.g., 297 Mpps or higher) of the prime-quality video content to a lower resolution (297 Mpps or lower such as 148.5 Mpps). In some aspects, the pixel-rate conversion may be achieved by pixel-dropping or by line-dropping, which may result in a lower quality output than by pixel-dropping.

The conversion block 240 may be disposed before the secondary tap 130, when the secondary paths are to operate in a single-bit precision (e.g., lower than the ultra-high bit precision of the prime-quality video content that can be 10-bit or higher bit precision such as 12, 16, or higher). In some aspects, each of the secondary paths may be operable at a different bit precision (e.g., 12, 10, 8, or lower), and thus may include their own conversion blocks.

In one or more implementations, the conversion block 240, as shown in FIG. 2B, may include a host interface 242, a receive (RX) video bus 244, a scaler-dithering module 246, a multiplexer 245, and a transmit (TX) video bus 248. The host interface 242 includes a register interface and is configured to provide programming for the scaler-dithering module 246. The RX video bus 244 receives input video content (e.g., prime-quality content) and may include an asynchronous first-input-first-output (FIFO). In some aspects, the input video content may be received multiple pixels at a time (e.g., multiple pixel wide such as dual pixel wide) via multiple parallel paths (e.g., a multiple-pixel video bus such a dual-pixel video bus), which can result in reduced cost and power consumption. The RX video bus 244 may be configured to perform multiple-pixel (e.g., dual-pixel) to single-pixel conversion, so that the single-pixel video data can be transmitted through a single-pixel video bus to the scaler-dithering module 246 for processing.

The scaler-dithering module 246 may perform scaler and/or dithering functionality to reduce the pixel rate, resolution, and/or bit-precision of the prime-quality video content to generate an output video data that has a lower pixel rate, resolution, and/or bit precision. The programming provided through the host interface 242 may control operation of the scaler-dithering module 246, for example, by providing information regarding the desired quality (e.g., pixel rate, resolution, and/or bit precision) of the output video data or other information. The scaler functionalities of the scaler-dithering module 246 may be performed by a finite-impulse-response (FIR) filter. In some aspects, the processing by the scaler-dithering module 246 may be bypassed through the bypass route 241. A bypass unit within the scaler-dithering module 246 may send a select signal 243 to the multiplexer 245, which can select, as a selected video data 247, one of the processed video content (e.g., the output of the scaler-dithering module 246) or the unprocessed video content (e.g., the prime-quality video content via the bypass route 241) based on the select signal 243. The selected video content 247, which is single-pixel video data, may then be converted to dual-pixel video content by the TX video bus 248 for further processing and/or display.

Figure 3:
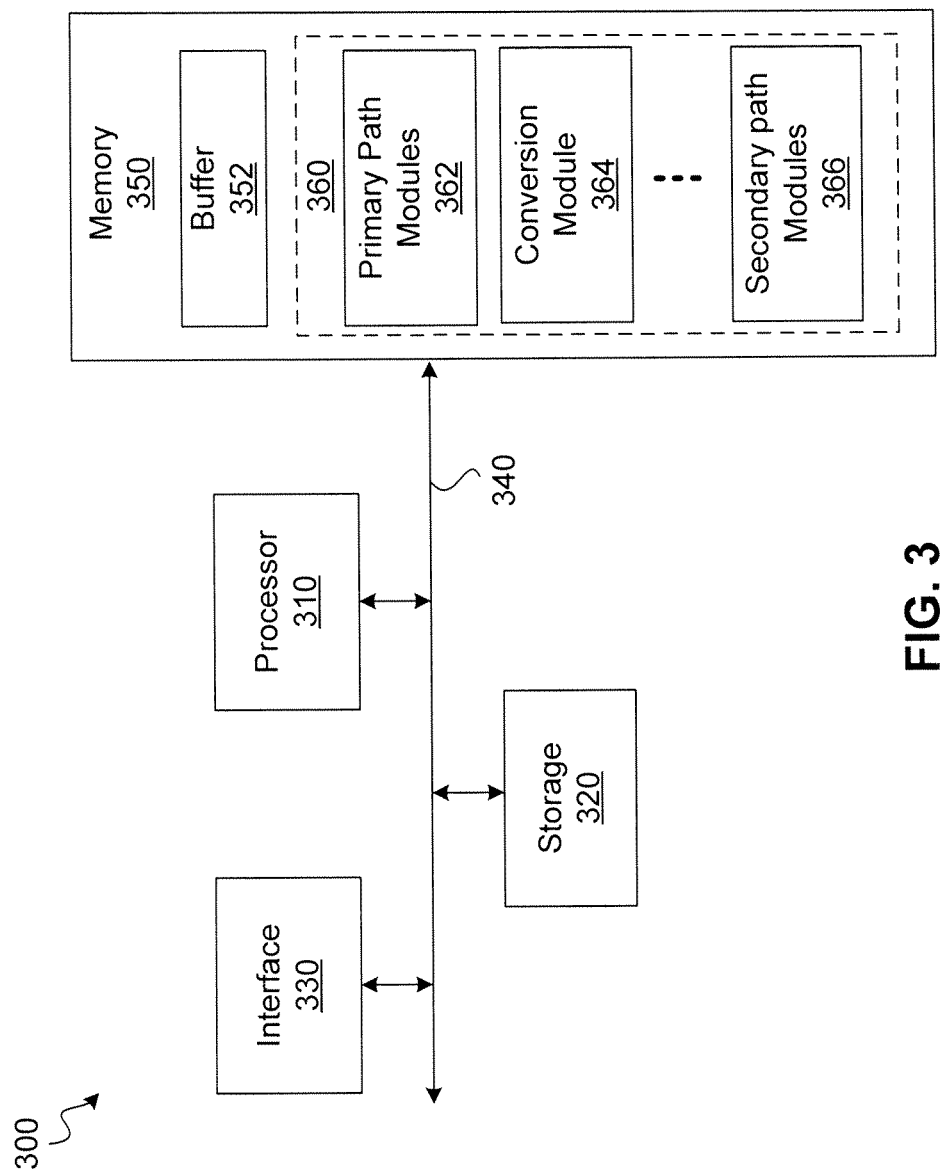
FIG. 3 illustrates a system for multiple-quality level video processing in accordance with one or more implementations.

FIG. 3 illustrates a system 300 for multiple-quality level video processing in accordance with one or more implementations of the subject technology. The system 300 may include a processor 310, a storage device 320, an interface 330, and memory 350, coupled to one another via a bus 340. Examples of the processor 310 may include a general-purpose processor, hardware cores, controllers, or any other type of processor. The interface 330 includes a host interface (e.g., the host interface 242 of FIG. 2B) may perform communications with other devices or modules to receive, for example, programming information for the scaler-dithering module 246 of FIG. 2B. The memory 350 may include RAM, DRAM, SRAM, T-RAM, Z-RAM, TTRAM, flash memory, or any other type of memory. The storage device 320 may include a disk drive, flash memory, or any other storage media.

The memory 350 may include one or more buffers 352 and program modules 360 including a primary path module 362, a conversion module 364, and a secondary path module 366. The primary path module 362, the conversion module 364, and the secondary path module 366, when executed by a processor (e.g., the processor 310) can perform some or all of the functionalities of the deinterlacer 220, primary processing block 230, the conversion block 240, and the secondary processing block 250 of FIG. 2A, respectively. In other words, in one or more implementations, some or all of the functionalities of the deinterlacer 220, primary processing block 230, the conversion block 240, and the secondary processing block 250 may be implemented in software, which may be included in the program modules 360 or stored in another storage device such as the storage device 320 and executed by a processor.

Figure 4:
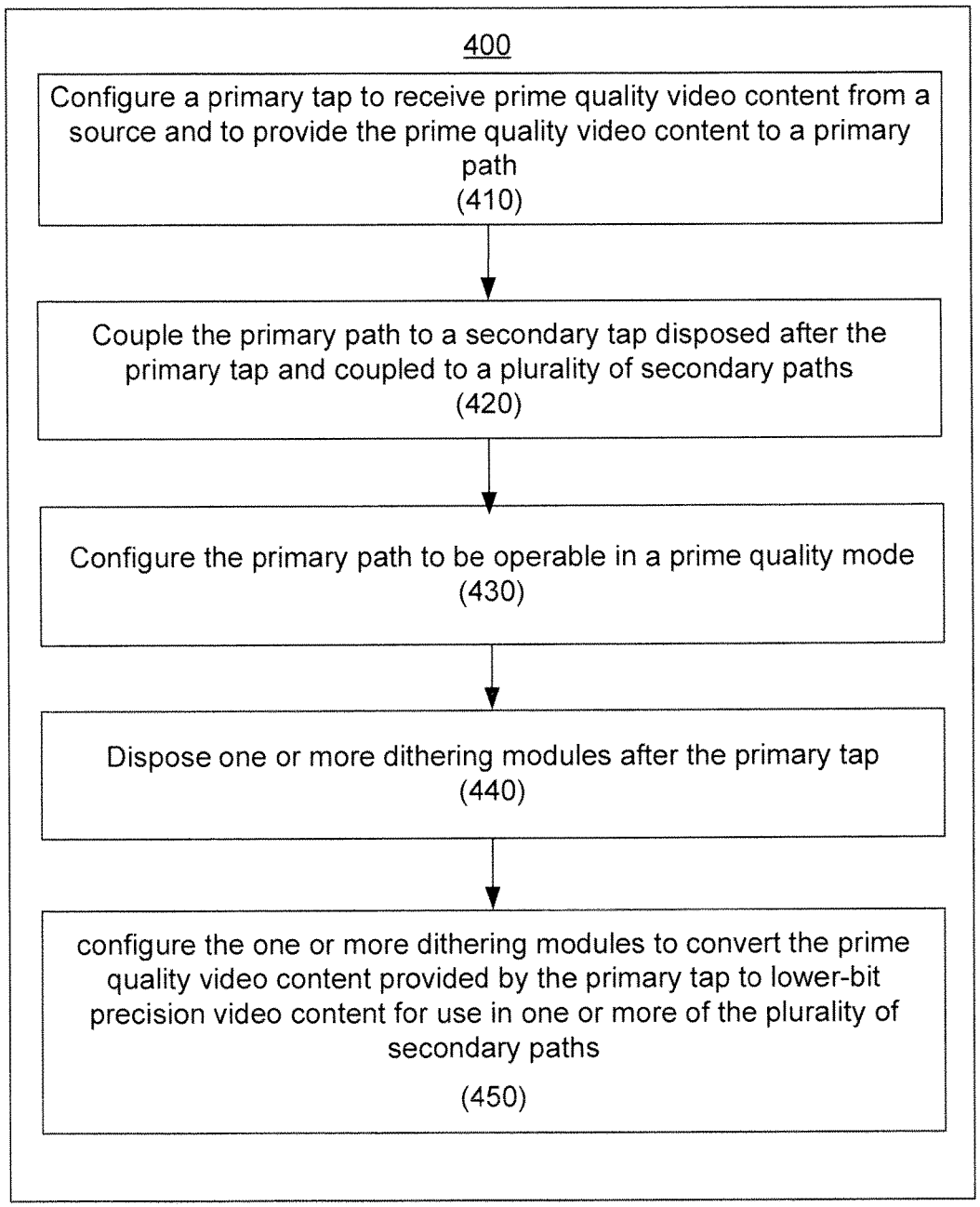
FIG. 4 illustrates an example of a method for multiple-quality level video processing in accordance with one or more implementations.

FIG. 4 illustrates an example of a method 400 for multiple-quality level video processing in accordance with one or more implementations of the subject technology. The steps of the method 400 do not need to be performed in the order shown and one or more steps may be omitted. A primary tap (e.g., 120 of FIG. 1) may be configured to receive prime-quality video content from a source (e.g., 110 of FIG. 1) and to provide the prime-quality video content to a primary path (e.g., 122 of FIG. 1) (410). The primary tap may be coupled to a secondary tap (e.g., 130 of FIG. 1) disposed after the primary tap and coupled to a plurality of secondary paths (e.g., 130-1, 130-2 . . . 130-N of FIG. 1) (420). The primary path may be configured to be operable in a prime-quality mode (430). One or more dithering modules (e.g., 125 of FIG. 1) may be disposed after the primary tap (440). The dithering module(s) may be configured to convert the prime-quality video content provided by the primary tap to lower-bit precision video content for use in one or more of the plurality of secondary paths (450).

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature of the subject technology.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

Those of skill in the art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising:
a primary tap coupled to a primary path and a secondary tap coupled to a plurality of secondary paths; and
a conversion block including a bypass-able scaler-dithering module couple through a multiplexer to a transmit video bus and configured to receive inputs from a host interface and a receive video bus,
wherein the device is configured to perform more-than-two quality level video processing, wherein the primary tap is configured to receive prime-quality video content from a source and to provide the prime-quality video content to the primary path operable in a prime-quality mode, wherein the primary tap is coupled to the secondary tap disposed after the primary tap and coupled to the plurality of secondary paths configured to process lower-bit precision video content, and wherein the receive video bus is configured to convert multiple-pixel video data to single-pixel video data.

2. The device of claim 1, wherein the secondary tap is configured to feed the plurality of secondary paths, and each of the plurality of secondary paths is operable in a respective secondary-quality mode that is achievable with less processing resources than the prime-quality mode.

3. The device of claim 1, wherein the prime-quality video content comprises at least one of an ultra-high bit precision, an ultra-high resolution, or an ultra-high pixel rate video content, and wherein the prime-quality mode comprises at least one of an ultra-high bit precision, an ultra-high resolution, or an ultra-high pixel rate mode.

4. The device of claim 3, wherein the ultra-high bit precision comprises a bit precision equal to or higher than 10-bit precision.

5. The device of claim 3, wherein the ultra-high resolution comprises a resolution equal to or higher than 4k×2k pixels resolution.

6. The device of claim 3, wherein the ultra-high pixel rate comprises a pixel rate equal to or higher than 297 mega-pixels per second (Mpps).

7. The device of claim 1, wherein the one or more dithering modules comprises a single dithering module disposed prior to the secondary tap, and wherein the single dithering module comprises a scaler configured to perform pixel-rate conversion.

8. The device of claim 1, wherein the one or more dithering modules comprises a plurality of dithering modules, and wherein at least some of the plurality of dithering modules are disposed within at least some of the plurality of secondary paths.

9. The device of claim 1, further comprising at least one of a scaler operable to convert video content to a lower resolution or a pixel-rate converter operable to convert a pixel rate associated with the video content to a lower pixel rate, wherein the at least one of the scaler or the pixel-rate converter is disposed in the primary path, and wherein the at least one of the scaler or the pixel-rate converter are disposed in one or more of the plurality of secondary paths.

10. A method comprising:
providing a device including a primary tap and a secondary tap coupled to a plurality of secondary paths; and
configuring the device to perform more-than-two quality level video processing by:
providing a conversion block including a bypass-able scaler-dithering module coupled through a multiplexer to a transmit video bus and configured to receive inputs from a host interface and a receive video bus;
configuring the receive video bus to convert multiplex-pixel video data to single-pixel video data;
configuring the primary tap to receive prime-quality video content from a source and to provide the prime-quality video content to the primary path;
coupling the primary tap to the secondary tap disposed after the primary tap and coupled to the plurality of secondary paths configured to process lower-bit precision video content; and
configuring the primary path to be operable in a prime-quality mode.

11. The method of claim 10, further comprising configuring the secondary tap to feed the plurality of secondary paths, and wherein each of the plurality of secondary paths is configured to be operable in a respective secondary-quality mode that is achievable with less processing resources than the prime-quality mode.

12. The method of claim 10, wherein configuring the primary path to be operable in the prime-quality mode comprises configuring the primary path to be operable in at least one of an ultra-high bit precision, an ultra-high resolution, or an ultra-high pixel rate mode.

13. The method of claim 12, wherein configuring the primary path to be operable in the ultra-high bit precision comprises configuring the primary path to be operable in a bit precision equal to or higher than 10-bit precision.

14. The method of claim 12, wherein configuring the primary path to be operable in the ultra-high resolution comprises configuring the primary path to be operable in a resolution equal to or higher than 4k×2k pixels resolution.

15. The method of claim 12, wherein configuring the primary path to be operable in the ultra-high pixel rate comprises configuring the primary path to be operable in a pixel rate equal to or higher than 297 mega-pixels per second (Mpps).

16. The method of claim 12, wherein disposing the one or more dithering modules comprises disposing a single dithering module prior to the secondary tap, and wherein the single dithering module comprises a scaler configured to perform pixel-rate conversion.

17. The method of claim 10, wherein disposing the one or more dithering modules comprises disposing a plurality of dithering modules, the method further comprises disposing at least some of the plurality of dithering modules within at least some of the plurality of secondary paths.

18. The method of claim 10, further comprising configuring at least one of a scaler to be operable to convert video content to a lower resolution or a pixel-rate converter to be operable to convert a pixel rate associated with the video content to a lower pixel rate; and disposing the at least one of the scaler or the pixel-rate converter in the primary path or one or more of the plurality of secondary paths.

19. A system comprising:
   memory; and
   one or more processors coupled to the memory and configured to execute one or more program modules to perform:
      receiving, at a primary tap, prime-quality video content from a source;
      providing the prime-quality video content to a primary path operable in a prime-quality mode; and
      dithering the prime-quality video by converting the prime-quality video content received at the primary tap to lower-bit precision video content at a lower frequency for use in one or more of a plurality of secondary paths coupled to a secondary tap disposed after the primary tap and coupled to the plurality of secondary paths,
   wherein the device is configured to perform more than two quality level video processing, wherein converting the prime-quality video content is performed by a conversion block including a bypass-able scaler-dithering module coupled through a multiplexer to a transmit video bus and configured to receive inputs from a host interface and a receive video bus, and wherein the receive video bus is configured to convert multiple-pixel video data to single-pixel video data.

20. The system of claim 19, wherein each of the plurality of secondary paths is configured to be operable in a respective secondary-quality mode that is achievable with less processing resources than the prime-quality mode, wherein dithering the prime-quality video is performed prior to the secondary tap, and wherein dithering the prime-quality video is performed in one or more of the plurality of secondary paths.

* * * * *